June 21, 1949. C. R. WILSON 2,474,079
ROTATING WING FOR AIRCRAFT
Filed Sept. 8, 1944 2 Sheets-Sheet 1

Inventor:
Christopher Robert Wilson,
By W. W. Williamson
Attorney.

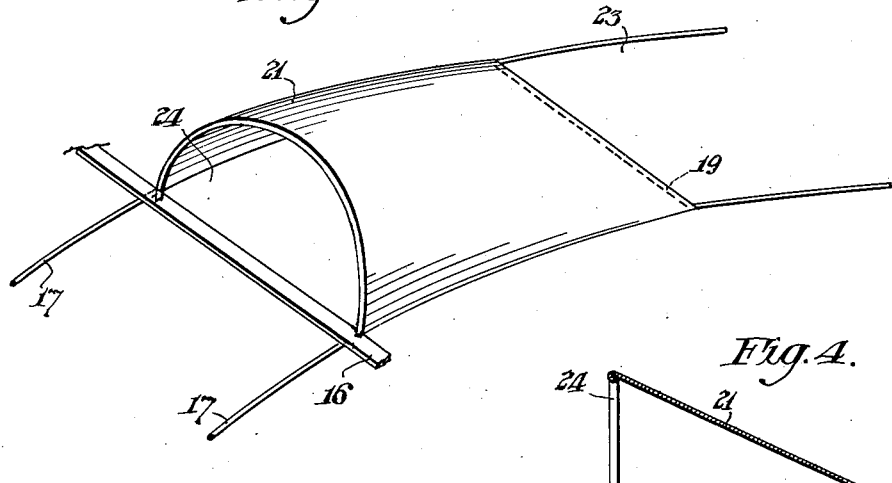
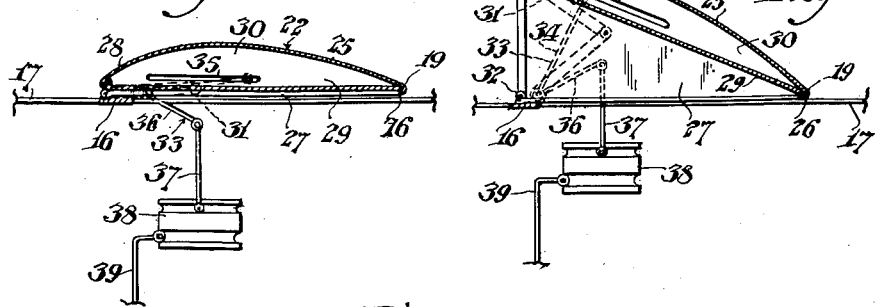
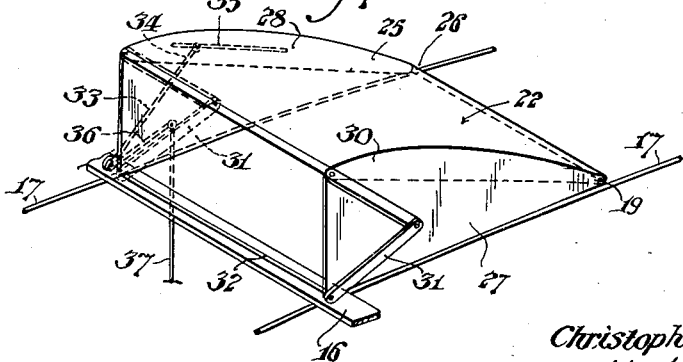

Patented June 21, 1949

2,474,079

UNITED STATES PATENT OFFICE 2,474,079

ROTATING WING FOR AIRCRAFT

Christopher R. Wilson, Philadelphia, Pa., assignor of one-half to Harry Waldman, Philadelphia, Pa.

Application September 8, 1944, Serial No. 553,223

1 Claim. (Cl. 170—135)

My invention relates to aircraft and particularly to improvements on the apparatus shown in my prior Patent No. 2,049,482, dated August 4, 1936.

The present invention is especially concerned with a circular wing for helicopter type of aircraft and may be the only sustaining means for the aircraft or may be used in conjunction with the ordinary airplane having a more or less rigid wing or plane structure.

One object of this invention is to provide a number of annularly spaced scoops on a circular wing structure which, in effect, constitute a plurality of hollow wing or plane sections revolving in a circle which will produce sufficient lifting power to raise the aircraft, with a heavy load, straight up, maintain it at any desired level, and permit it to descend at a selected slow speed for landing in a restricted area.

Another object of the invention is to provide a plurality of scoops in one or a number of concentric circles in the same horizontal plane, annularly spaced and in staggered relation where there is more than one circle of scoops.

Another object of the invention is to provide rigid scoops that constantly remain open at their mouth ends or ones that are adjustable for opening and closing the mouth ends, more or less, to regulate the scooping effect as required due to differences in wind velocity and the revolutions per minute of the wing structure.

Another object of the invention is to provide a wing structure including a number of spaced scoops on a revolving annular member, said scoops being open at the bottom and having mouths, and the spaces between said scoops affording ready passage of air through the wing structure during ascent or descent and the escape of air over the scoops to prevent the creation of back eddies.

Another object of the invention is to construct the upper surfaces of the scoops of a shape similar to airplane wings in order to obtain the benefit of vacuum lift over the top of the angle of incidence.

A further object of this invention is to combine speed with the ability to ascend and descend perpendicularly. This advantageous condition is brought about particularly with the structure having adjustable scoops which, when closed, provide a substantially round wing, similar to a disc, having practically no resistance to forward travel, either while being revolved or "free wheeling," while the direction of the aircraft, either up or down and to the right or left would be controlled by ailerons and rudders.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawings forming a part hereof, in which:

Fig. 3 is an enlarged fragmentary perspective view of the wing structure illustrating one of the constantly open scoops.

Fig. 4 is a longitudinal vertical section thereof.

Fig. 5 is a sectional view of one of the adjustable scoops in a closed position.

Fig. 6 is a sectional view of one of the adjustable scoops in open position.

Fig. 7 is a fragmentary perspective view of the wing structure in the region of one of the adjustable scoops.

Figure 1:
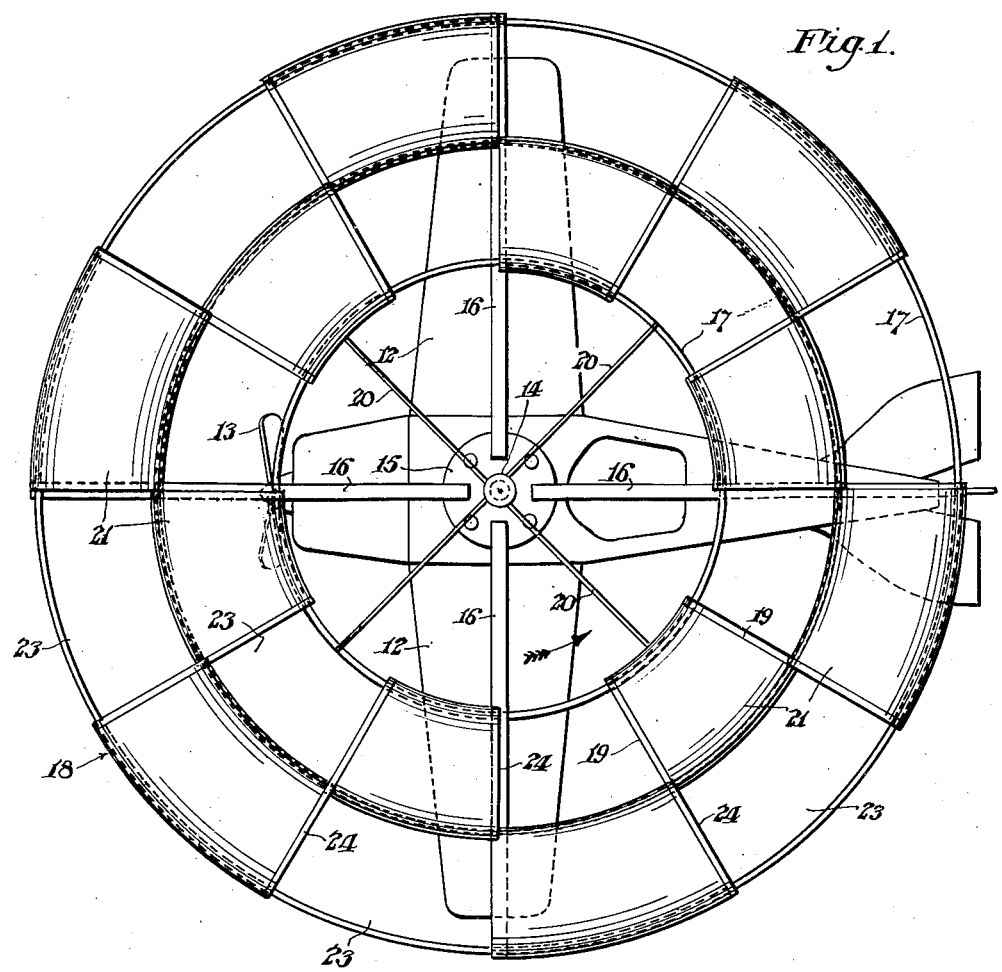
Fig. 1 is a top plan view of an aircraft constructed in accordance with my invention.

In carrying out my invention as herein embodied 10 represents a sleeve or similar support revolvably mounted on a vertical mast carried by an airplane body 11 including the usual wings 12, rudders, ailerons, etc., and enclosing a motor for driving the propeller 13. On top of the sleeve 10 is a flange cap 14 and intermediate its height is a flange collar 15.

The flange collar 15 supports any desirable number of radial struts 16 which, in turn, support a plurality of concentric rings 17 forming parts of the annular wing structure 18. Secondary radial struts 19 are connected with the rings 17 at suitably spaced locations, the distances between all of the struts, preferably, being equal to the lengths of the scoops to be presently described. The wing structure is further supported or strengthened by guys 20 connected with the wing structure frame and the flange cap 14.

Figure 2:
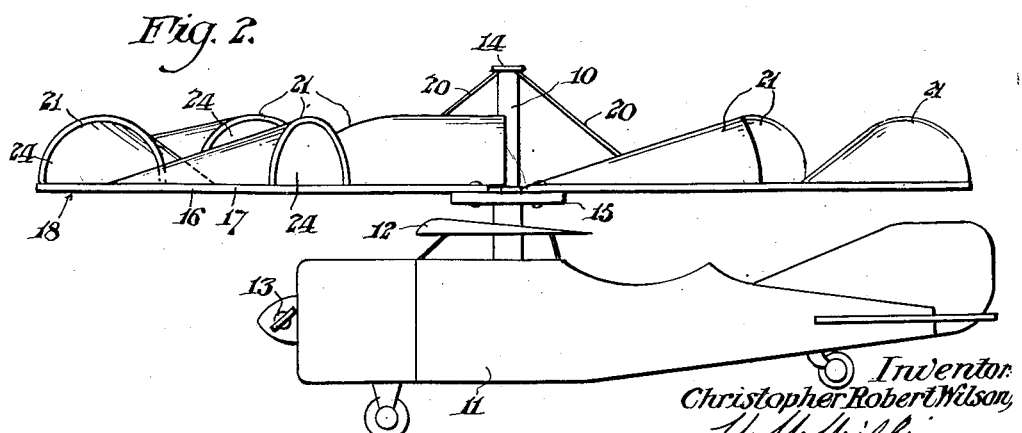
Fig. 2 is a side view thereof.

Between any pair of adjacent rings 17 are mounted the scoops 21 and 22 or a combination of both. For purposes of illustration, only scoops 21 are shown in Figs. 1 and 2. The scoops are mounted in annularly spaced relation so as to leave an unoccupied space or opening 23 between annularly adjacent scoops and where there are two or more circles of scoops, those in circles preferably are in staggered relation to one another.

These scoops 21 are open at their forward ends to provide mouths 24 for the admission of air and said forward ends are of arched formation and can be curved, as shown, or rectangular or partly curved and partly straight. Said scoops incline rearwardly from the tops of the mouths to the rings and the bottoms are completely open.

As previously stated, the adjustable scoops 22 may be substituted for or used in conjunction with the scoops 21 and are mounted on pairs of the concentric rings 17. Each adjustable scoop 22 includes a rigid top 25 having the general configuration of the usual airplane wing to obtain the benefits so well known in airplane construction, in addition to the advantages accruing from the air gathering effect of the scoop formation.

The top is hingedly connected at the rear thereof to the rings 17, as at 26. Between the rings and the side edges of the top 25 are flexible or pliable sides 27 which fold up in bellows or accordion fashion when the top 25 is retracted, collapsed or moved towards the rings 17, more or less, as indicated by the illustration in Fig. 5.

The top 25 preferably comprises the convex outer wall 28, an inner straight or flat wall 29 and end walls 30. The forward end of the top is connected to toggle levers 31 which may be attached to a shaft 32 along a strut, as 16. The elbow of a bell crank lever 33 is also fixed to said shaft 32 and one arm, as 34, has its end bent at right angles and slidably mounted in a slot 35 in an end wall 30 of the top 25. To the other arm 36 of said bell crank lever 33 is pivotally attached one end of a connecting rod 37, the other end of said rod being attached to a collar 38 which is mounted on the sleeve 10 to revolve therewith and slide longitudinally thereon. This collar 38 has a groove into which a shifting lever 39 projects for sliding said collar to actuate the adjusting mechanism of each scoop, said shifting lever 39 being in easy access of the operator of the aircraft.

Like the rigid scoops, the adjustable ones each have a mouth 40 at the forward end, which mouth may be partially or completely opened and closed and these adjustable scoops are entirely open at the bottoms.

In operation, when the annular wing is revolved the scoops gather in air and force it downward to produce a lifting action and at the same time the convex upper surfaces of said scoops create a vacuum condition which also produces a lifting action. These two lifting actions combined and in conjunction with the proper speed of revolution of the wing causes the aircraft to ascend effectively with great power. The speed of ascent depends upon the speed of revolution of the wing which also controls the descent as well as the hovering ability of the aircraft at any altitude. During forward propulsion of the aircraft, the annular wing with its scoops functions similar to the ordinary plane wings, whether being revolved by the motor or allowed to rotate freely and therefore high speed can be obtained.

When the scoops are of the adjustable type, they may be opened any desired amount which will assist, to a considerable extent, both the ascent and descent of the aircraft and when completely closed a highly effective disc shaped wing is provided that will present practically no resistance to forward motion of the aircraft.

In any instance, the spaces behind the scoops act as vents to prevent building up of air pressure above or below the annular wing during ascent and descent of the aircraft.

From the foregoing it will be apparent that I have provided a wing for aircraft which has considerable lifting power making it possible to lift an aircraft perpendicularly or permit it to descend in a similar manner and also act as a sustaining element during forward motion with a minimum of resistance.

Of course I do not wish to be limited to the exact details of construction herein shown and described as these may be varied within the scope of the appended claim without departing from the spirit of my invention.

Having described my invention what I claim as new and useful is:

An aircraft wing comprising radial struts, concentric rings supported by said struts and constituting a frame, a plurality of scoops mounted on said frame in spaced relation, said scoops each including a top comprised of rigid outer, inner and end walls with pliable sides connected to the top and their respective rings, said top being hingedly connected at the rear to the frame, toggle levers connected to the forward ends of the scoop tops and to the frame, and means to raise and lower the forward ends of said tops.

CHRISTOPHER R. WILSON.

REFERENCES CITED

The following references are of record in the file of this patent:

UNITED STATES PATENTS

| Number | Name | Date |
|---|---|---|
| 943,732 | Bratschie | Dec. 21, 1909 |
| 996,815 | Wait | July 4, 1911 |
| 1,084,807 | Lester | Jan. 20, 1914 |
| 1,753,112 | Engledow | Apr. 1, 1930 |

FOREIGN PATENTS

| Number | Country | Date |
|---|---|---|
| 23,471 | Great Britain | 1913 |